(12) United States Patent
Iiyama et al.

(10) Patent No.: US 11,796,865 B2
(45) Date of Patent: *Oct. 24, 2023

(54) SPACER-CONTAINING TAPE (71) Applicant: DEXERIALS CORPORATION, Shimotsuke (JP)

(72) Inventors: Masahiro Iiyama, Utsunomiya (JP); Reiji Tsukao, Utsunomiya (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,936

(22) Filed: Mar. 24, 2022

(65) Prior Publication Data

US 2022/0254540 A1 Aug. 11, 2022

Related U.S. Application Data (63) Continuation of application No. 16/630,883, filed as application No. PCT/JP2018/028629 on Jul. 31, 2018, now Pat. No. 11,327,368.

(30) Foreign Application Priority Data

Aug. 23, 2017 (JP) .................................. 2017-160668

(51) Int. Cl.
*G02F 1/1339* (2006.01)
*B32B 27/08* (2006.01)
(Continued)

(52) U.S. Cl.
CPC .......... *G02F 1/13392* (2013.01); *B32B 27/08* (2013.01); *B32B 27/14* (2013.01);
(Continued)

(58) Field of Classification Search
None
See application file for complete search history.

(56) References Cited

U.S. PATENT DOCUMENTS 6,180,226 B1 1/2001 McArdle et al.
2015/0076273 A1 3/2015 Rudin et al.

FOREIGN PATENT DOCUMENTS

JP H11-514755 A 12/1999
JP 2000-214470 A 8/2000
(Continued)

OTHER PUBLICATIONS

Oct. 16, 2018 Search Report issued in International Patent Application No. PCT/JP2018/028629.
(Continued)

*Primary Examiner* — Richard H Kim
(74) *Attorney, Agent, or Firm* — Oliff PLC (57) ABSTRACT

A conductive tape comprising a conductive particle-containing layer containing at least a binder resin layer and a plurality of conductive particles, In this conductive tape, the plurality of conductive particles are distributedly disposed independently from each other on one surface of the binder resin layer, a surface of the binder resin layer in a vicinity of each of the conductive particles has an inclination or an undulation with respect to a tangent plane of the binder resin layer in a center portion between adjacent conductive particles, in the inclination, the surface of the binder resin layer around the conductive particle is lacked with respect to the tangent plane, and in the undulation, a resin amount of the binder resin layer right above the conductive particle is smaller than that when the surface of the binder resin layer right above the conductive particle is flush with the tangent plane.

12 Claims, 6 Drawing Sheets

(X-X Cross-Sectional View)

(51) Int. Cl.
*B32B 27/14* (2006.01)
*H01B 1/20* (2006.01)
*H01R 4/04* (2006.01)

(52) U.S. Cl.
CPC ............... *H01B 1/20* (2013.01); *H01R 4/04* (2013.01); *B32B 2307/202* (2013.01); *B32B 2405/00* (2013.01); *C09J 2203/318* (2013.01); *C09J 2301/408* (2020.08); *G02F 1/1339* (2013.01); *G02F 1/13398* (2021.01)

(56) References Cited

FOREIGN PATENT DOCUMENTS

| | | |
|---|---|---|
| JP | 2000-258774 A | 9/2000 |
| JP | 2000-275654 A | 10/2000 |
| JP | 2003-68802 A | 3/2003 |
| JP | 2003-218170 A | 7/2003 |
| JP | 2010-145756 A | 7/2010 |
| JP | 2010-222144 A | 10/2010 |
| JP | 2014-041282 A | 3/2014 |
| JP | 2014-060150 A | 4/2014 |
| JP | 2015-25104 A | 2/2015 |
| JP | 2015-134887 A | 7/2015 |
| JP | 6163045 B2 | 7/2017 |
| KR | 10-2004-0002522 A | 1/2004 |
| KR | 10-2016-0031448 A | 3/2016 |
| WO | 2014/030753 A1 | 2/2014 |
| WO | 2015/141289 A1 | 9/2015 |
| WO | 2016/002336 A1 | 1/2016 |

OTHER PUBLICATIONS

Oct. 16, 2018 Written Opinion of the International Searching Authority issued in International Patent Application No. PCT/JP2018/028629.
Jul. 17, 2019 International Preliminary Report on Patentability issued in International Patent Application No. PCT/JP2018/028629.
Nov. 25, 2020 Office Action issued in Korean Patent Application No. 10-2020-7004338.
Aug. 31, 2021 Office Action issued in Japanese Patent Application No. 2017-160668.
Nov. 26, 2021 Office Action issued in Chinese Patent Application No. 201880052936.5.
Jan. 21, 2022 Office Action issued in Korean Patent Application No. 10-2021-7030638.
Jan. 20, 2022 Office Action issued in Taiwanese Patent Application No. 107128437.
Dec. 27, 2022 Office Action issued in Japanese Patent Application No. 2022-074598.

(X-X Cross-Sectional View)

SPACER-CONTAINING TAPE

CROSS-REFERENCE TO RELATED APPLICATIONS

This is a Continuation of application Ser. No. 16/630,883 filed Jan. 14, 2020, which in turn is a national stage entry of PCT/JP2018/028629 filed Jul. 31, 2018, which claims priority to JP 2017-160668 filed Aug. 23, 2017. The disclosure of the prior applications is hereby incorporated by reference herein in its entirety.

TECHNICAL FIELD

The present invention relates to a spacer-containing tape which is suitably applicable to liquid crystal display devices.

BACKGROUND ART

Disposing two members opposite to each other while maintaining a certain gap (gap formation) with spacers interposed therebetween is performed in various fields. For example, the followings are attempted in the field of liquid crystal display devices: applying an adhesive to the rim of one surface of a liquid crystal display element, spraying, on the adhesive-applied portion, fine resin beads to serve as spacers, and thereafter bonding a frame-like body; applying a resin paste in which spacers are dispersed to the rim of one surface of a liquid crystal display element, and thereafter bonding a frame-like body (Patent Literature 1); and using a technique (Patent Literature 2) of forming projections as spacers on a substrate to form projections on the rim of one surface of a liquid crystal display element, thereafter applying an adhesive thereto, and bonding a frame-like body to the adhesive-applied portion.

CITATION LIST

Patent Literature

Patent Literature 1: Japanese Patent Application Laid-Open No. 2015-134887
Patent Literature 2: Japanese Patent Application Laid-Open No. 2014-41282

SUMMARY OF INVENTION

Technical Problem

However, when the technique of forming, on a substrate, projections to serve as spacers was used to dispose spacers at prescribed positions, a spacer forming step became complicated due to utilization of a photolithography technique. Accordingly, there have been problems in that not only forming costs increase, but also a condition for performing a spacer forming step varies for each substrate or member on which spacers are to be disposed. Also, in the method of spraying fine resin beads, the spacer forming step was relatively simple and low in cost, but resin beads are sometimes sprayed unevenly. Accordingly, it was difficult to constantly form an extraordinarily narrow and uniform gap within small surface areas. Thus, there has been a problem in that it is difficult to narrow the frame-like body. Furthermore, in the method of using a resin paste in which spacers are dispersed, there has been a problem in that a resin paste having a high viscosity inhibits the dispersion of spacers to an intended degree.

A problem to be solved by the present invention is to enable the formation of a fine and uniform gap between various members and substrates for general purposes at low cost, without the necessity of performing a spacer forming step specialized for each substrate or member on which spacers are to be disposed.

Solution to Problem

The present inventor has found that the use of a product obtained by previously dispersing and disposing spacers in a binder resin layer to form a film enables the formation of a fine and uniform gap between various members and substrates for general purposes at low cost, and thus, accomplished the present invention.

That is, the present invention provides a spacer-containing tape including a spacer-dispersed layer containing at least a binder resin layer and a plurality of spacers, wherein the plurality of spacers are distributedly disposed independently from each other on one surface of the binder resin layer.

Also, the present invention provides a method of producing a spacer-containing tape, including a step of forming a spacer-dispersed layer containing at least a binder resin layer and a plurality of spacers, wherein the step of forming a spacer-dispersed layer has a step of retaining a state in which spacers are dispersed on a surface of the binder resin layer, and a step of pushing the spacers dispersed and retained on the surface of the binder resin layer into the binder resin layer. In the step of pushing the spacers into the binder resin layer of this production method, the viscosity of the binder resin layer, the pushing speed, or the temperature when the spacers are pushed is preferably adjusted such that: a surface of the binder resin layer in the vicinity of each of the spacers has an inclination or an undulation with respect to the tangent plane of the binder resin layer in the center portion between adjacent spacers; in the inclination, the surface of the binder resin layer around the spacer is lacked with respect to the tangent plane; and in the undulation, the resin amount of the binder resin layer right above the spacer is smaller than that when the surface of the binder resin layer right above the spacer is flush with the tangent plane.

Furthermore, the present invention provides a bonded structure in which a first component and a second component are bonded with the spacer-containing tape of the present invention interposed therebetween.

Advantageous Effects of Invention

Since the plurality of spacers are distributedly disposed independently from each other on one surface of the binder resin layer in the spacer-dispersed layer of the spacer-containing tape according to the present invention, a fine and uniform gap can be formed on a member or substrate having a varied shape and size at low cost by changing the length of the tape or the number of tapes to be bonded orderly. Accordingly, a frame-like body of a liquid crystal display device can be narrowed.

DESCRIPTION OF EMBODIMENTS

Hereinafter, the spacer-containing tape of the present invention will be described in detail with reference to the drawings. However, the present invention is not limited to aspects described below. It is noted that the same reference numerals indicate the same or equivalent constituents in the drawings.

<Entire Configuration of Spacer-Containing Tape>

Figure 1:
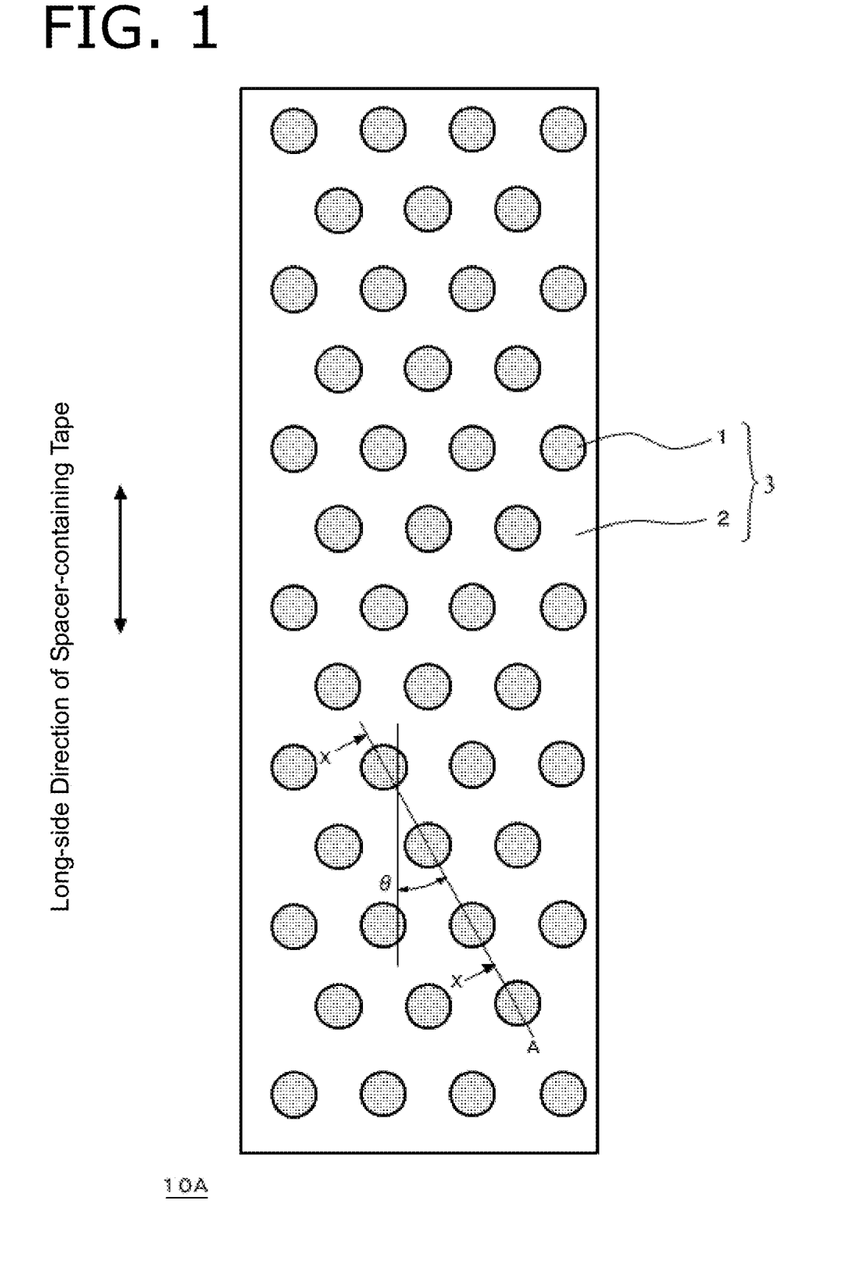
FIG. 1 is a plan view illustrating a disposition of spacers in a spacer-containing tape 10A according to an example.
Figure 2:
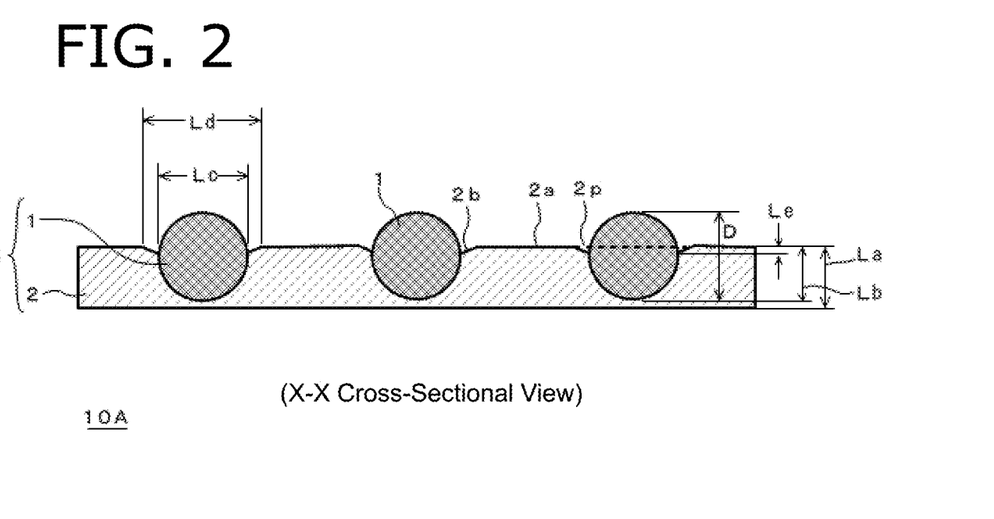
FIG. 2 is a cross-sectional view of a spacer-containing tape according to an example in which inclinations exist on a surface.

FIG. 1 is a plan view illustrating a disposition of spacers 1 of a spacer-containing tape 10A according to an example of the present invention, and FIG. 2 is an X-X cross-sectional view of the spacer-containing tape 10A.

Although minimum melt viscosity is not particularly limited in a spacer-dispersed layer 3 of this spacer-containing tape 10A, the plurality of spacers 1 are distributedly disposed independently from each other on one surface of a binder resin layer 2 which is formed of a high-viscosity resin of preferably 1000 Pa·s or more for the later-described reason. The spacers 1 are preferably regularly dispersed.

<Spacer>

The spacer 1 is appropriately selected according to the use application and use location of the spacer-containing tape (for example, the display surface of a liquid crystal display element, the frame-like body of a liquid crystal display device, etc.), and may be organic particles or inorganic particles. Moreover, these organic particles and inorganic particles may be insulative or conductive. Further, they may be light transmissive, light reflective or light absorptive. Two or more types thereof having different sizes or being different types may be used in combination according to use applications or purposes.

Preferred examples of the organic particles may include known resin particles including polyamide particles such as nylon 6, nylon 12, and nylon 66, fluorine-based resin particles such as polytetrafluoroethylene and polyvinylidene fluoride, polyolefin particles such as polyethylene and polypropylene, polyester particles such as polyethylene terephthalate and polyethylene naphthalate, and rubber particles such as natural rubber, isoprene rubber, acrylic rubber, silicone rubber, butadiene rubber, styrene rubber, urethane rubber, and fluorine rubber. Metal-coated resin particles in which the surfaces of resin particles have been subjected metal plating may be used. Of these, resin particles and silicone rubber particles are preferred. Two or more kinds thereof may be used in combination.

Preferred inorganic particles may include fused silica, crystalline silica, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, magnesium hydroxide, calcium silicate, aluminum silicate, lithium aluminum silicate, zirconium silicate, barium titanate, glass fiber, carbon fiber, and molybdenum disulfide, metal particles such as nickel, cobalt, silver, copper, gold, and palladium, and alloy particles such as solder. Two or more kinds thereof may be used in combination. Particles that can be used as conductive particles such as metal-coated resin particles, metal particles, and alloy particles may also be used for vertical conduction described later.

The shape of the spacers 1 is appropriately selected and determined from spherical, oval sphere, columnar, needle-like, and a combination thereof, depending on use applications of the spacer-containing tape. The shape is preferably spherical, more preferably substantially perfect sphere, because the disposition of the spacers can be easily confirmed, and a uniform state is easily retained. For example, when a spacer-containing tape obtained by arranging spacers with a transfer mold as described in Japanese Patent Application Laid-Open No. 2014-60150 is produced, spacers smoothly roll on the transfer mold, and therefore can be filled at predetermined positions on the transfer mold with high precision. Thus, spacers can be precisely disposed.

The particle diameter D of the spacers 1 may be appropriately selected such that it can adapt to the surface roughness (for example, variations in wiring height) of a gap-formed surface. Since a too small particle diameter inhibits the exhibition of performance, the particle diameter D is preferably 1 μm or more, and more preferably 3 μm or more. Although the upper limit is not particularly limited, 30 μm or less is preferable, because the tape does not become too thick. The particle diameter of the spacers before they are distributedly disposed in the binder resin layer 2 can be measured by a known particle size distribution measuring device. The average particle diameter can also be determined using a particle size distribution measuring device. An example of the measuring device may include a wet flow-type particle diameter and shape analyzer FPIA-3000 (Malvern Panalytical Ltd.) as an image-type particle size distribution measuring device. The particle diameter D of the spacers 1 in the spacer-containing tape can be determined by the observation with an electron microscope such as an SEM. In this case, the number of samples to be measured is preferably 200 or more, and more preferably 1000 or more for calculating an average particle diameter. The number of samples may be adjusted depending on a measurement method. When the sample is a tape itself, the particle diameter in the tape can be determined by the observation with a metallurgical microscope or an electron microscope such as an SEM, or may be determined by measuring an observation image using an image analysis software (for example, WinROOF, Mitani Corporation). When the shape of the spacers 1 is not spherical, the maximum length or the diameter of an imitated spherical shape, which is measured on the basis of a planar image or cross-sectional image of the tape, can be defined as the particle diameter of the spacers 1 for calculating an average particle diameter. In this case, the number of measured samples is preferably 200 or more, and more preferably 1000 or more.

<Arrangement of Spacers>

In the spacer-containing tape according to the present invention, the plurality of spacers 1 are independently distributedly disposed in the plan view of the tape. The spacers 1 may be disposed randomly, but are preferably distributedly disposed regularly. It is preferable that the spacers 1 be present while being not in contact with each other in the plan view of the film, and that they be present while not overlapping each other in the thickness direction of the tape. The spacers 1 may be intentionally brought into contact with each other. Therefore, the ratio of the number of the spacers 1 which are not in contact with each other relative to all of the spacers 1 is 95% or more, preferably 98% or more, and more preferably 99.5% or more. When the spacers 1 are intentionally brought into contact with each other, a contacting state is considered as one spacer. Also, the spacers 1 are preferably aligned in position in the tape thickness direction. For example, the spacers 1 can be arranged in a hexagonal lattice arrangement as illustrated in FIG. 1, and an embedded amount Lb of the spacer 1 in the tape thickness direction can be the same among the spacers 1 as described later.

For uniforming the optical, mechanical, or electrical characteristics of the spacer-containing film, the spacers 1 are preferably arranged regularly in the plan view of the film as previously described. An aspect of the arrangement is not particularly limited. Examples thereof may include, in the plan view of the film, lattice arrangements such as a square lattice arrangement, a rectangular lattice arrangement, an orthorhombic lattice arrangement, a hexagonal lattice arrangement, and a triangle lattice arrangement. Lattices having different shapes may be combined. As an aspect of the arrangement of the spacers, particle lines each including the spacers linearly arranged at predetermined intervals may be arranged in parallel at predetermined intervals. As another aspect, some of the spacers disposed in a predetermined regular manner (FIG. 1) may be missing, and the locations of the missing of spacers may exist regularly in a predetermined direction of the film. When such missing of spacers is allowed to exist repeatedly in the long-side direction of the film, or the locations of such missing of spacers increase or decrease gradually in the long-side direction, lot management is enabled, which can also impart traceability (a property to enable tracing) to the spacer-containing film and a bonded structure produced with the spacer-containing film. This is effective for, for example, forgery prevention, determination of authenticity, unauthorized use prevention of the spacer-containing film and a bonded structure produced with the spacer-containing film.

Also, when the spacers 1 are not in contact with each other, and are arranged in a regular manner such as in a lattice form, a pressure can be equally applied to the spacers 1 when the spacer-containing film is pressure-bonded to an article, thereby reducing variations in a pressure-bonded state. It is noted that the regular disposition of the spacers is not particularly limited, as long as a pattern is repeated in the long-side direction of the tape. A preferable method for disposing the spacers while suppressing minor misalignment may include previously preparing a mold in which portions at which spacers are to be disposed when a spacer-containing tape is produced as described later are defined, disposing spacers at the portions, and transferring the spacers into a resin layer.

When the arrangement of the spacers 1 has a lattice axis or an arrangement axis in the present invention, the lattice axis or arrangement axis may be parallel to or may intersect with the long-side direction of the spacer-containing tape, and can be determined depending on, for example, the surface roughness of a member or substrate to be bonded. For example, when the spacer-containing tape is produced as a vertically conductive tape (a tape which enables vertical conduction and prevents or suppresses conduction in a tape surface direction (for example, see Claim 4 of Japanese Patent No. 6163045)), it is preferable that at least one lattice axis A of the spacers 1 be obliquely set with respect to the long-side direction of the spacer-containing tape 10A, and that an angle θ formed between the long-side direction of the spacer-containing tape 10A and the lattice axis A be 5° to 85°, as illustrated in FIG. 1. With such oblique setting, it is expected that a pressure is likely to be uniformly applied to the entire tape.

In the present invention, an inter-particle distance of the spacers 1 is not particularly limited, because it is appropriately determined depending on, for example, the surface roughness of a member or substrate to be bonded with the spacer-containing tape. As an example, the inter-particle distance can be set such that the area occupancy ratio of the spacers 1 in the spacer-containing tape is 35% or less and 0.5% or more. Also, the number density of the spacers is, but not limited to, preferably 30 to 50000 particles/mm², as described later.

<Number Density of Spacers>

In the present invention, the number density of the spacers can be determined by the observation with a metallurgical microscope. In that case, a plurality of rectangular regions (5 or more regions, and preferably 10 or more regions) each having sides with 100 µm or more is optionally set such that a total area of the measurement regions becomes 2 mm² or more. Adjustment is allowed as necessary.

The number density of the spacers may also be determined by measuring an observation image using an image analysis software (for example, WinROOF, Mitani Corporation), other than the observation with a metallurgical microscope as described above.

The number density of the spacers is set depending on, for example, the particle diameter of the spacers, and hardness, on the condition that the area occupancy ratio of the spacers is 35% or less. When the number density of the spacers is too small, the spacers cannot serve as spacers. On the other hand, when it is too large, thrust required for the connection of the tape becomes excessively large. Therefore, when the particle diameter of the spacers is 1 to 30 µm, the number density thereof is preferably 30 to 50000 particles/mm², and more preferably 150 to 35000 particles/mm².

<Area Occupancy Ratio of Spacers>

In the spacer-containing tape according to the present invention, the area occupancy ratio of the spacers is preferably 35% or less, more preferably 25% or less, and particularly preferably less than 20% in terms of preventing thrust required of a pressing jig in bonding a member or substrate (in forming a gap) from becoming excessively large, and is preferably 0.5% or more, more preferably 1% or more, and particularly preferably 2% or more in terms of achieving a stable formation of gap. The area occupancy ratio of the spacers may be calculated according to the formula below.

$$[\text{Area occupancy ratio of spacers}] = [\text{number density of spacers in plan view}] \times [\text{average of plan view area per spacer}] \times 100$$

In the formula, the number density of the spacers is determined by the previously described method, and the average of the plan view area per spacer is determined by measuring an observation image of a tape surface with a metallurgical microscope or the like as described above. An image analysis software may be used.

In the present invention, the area occupancy ratio of the spacers is used as an index of the thrust required for a pressing jig used for heat-pressure bonding when a gap is formed with the spacer-containing tape, and the particle diameter and the number density of the spacers, and the like are set such that the area occupancy ratio of the spacers become 35% or less. In the past, the inter-particle distance and the number density of the spacers were set depending on the surface roughness of a member or substrate, the particle diameter of the spacers, the arrangement of the spacers, and the like. However, in the present invention, the inter-particle distance and the number density of the spacers are further set such that the area occupancy ratio of the spacers becomes 35% or less. This eliminates the need for excessively high thrust when the spacer-containing tape is pressure-bonded with facing components.

<Binder Resin Layer>
(Viscosity of Binder Resin Layer)

The minimum melt viscosity of the binder resin layer 2 is not particularly limited, and can be appropriately set depending on a target object to which the spacer-containing tape is applied and a method of producing the spacer-containing tape. Although the minimum melt viscosity is not particularly limited as long as later-described concaves 2b and 2c can be formed, it can be, for example, about 1000 Pa·s for a certain method of producing the spacer-containing tape. Meanwhile, when a step of retaining spacers in a predetermined disposition on the surface of a binder resin layer and pushing the spacers into the binder resin layer is performed as a method of producing the spacer-containing tape, the minimum melt viscosity is preferably 1100 Pa·s or more so that a film can be formed with the binder resin layer.

Figure 3:
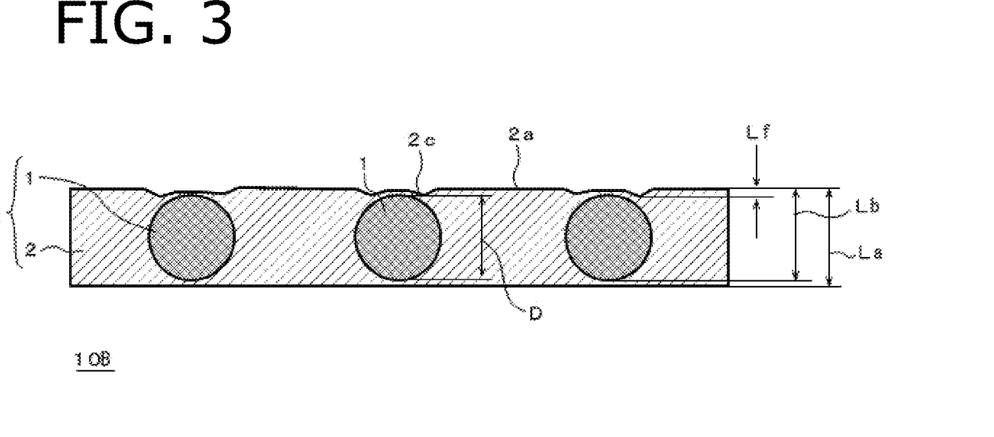
FIG. 3 is a cross-sectional view of a spacer-containing tape according to an example in which undulations exit on a surface.

Also, as will be described later in the method for producing the spacer-containing tape, the minimum melt viscosity is preferably 1500 Pa·s or more, more preferably 2000 Pa·s or more, further preferably 3000 to 15000 Pa·s, and furthermore preferably 3000 to 10000 Pa·s, in terms of forming the concave 2b around the exposed portion of the spacer 1 pushed into the binder resin layer 2 as illustrated in FIG. 2, or forming the concave 2c right above the spacer 1 pushed into the binder resin layer 2 as illustrated in FIG. 3. This minimum melt viscosity can be determined by, for example, using a rotary rheometer (TA Instruments), maintaining the measurement pressure at 5 g constantly, and using a measurement plate having a diameter of 8 mm. More specifically, the minimum melt viscosity can be determined under the conditions of the temperature range of 30 to 200° C., a rate of temperature increase of 10° C./min, a measurement frequency of 10 Hz, and a load variation of 5 g with respect to the measurement plate.

When the minimum melt viscosity of the binder resin layer 2 is as high as 1500 Pa·s or more, undesired movement of spacers can be suppressed when the spacer-containing tape is pressure-bonded to an article (when a gap is formed).

Also, in the case of forming the spacer-dispersed layer 3 of the spacer-containing tape 10A by pushing the spacers 1 into the binder resin layer 2, the binder resin 2 when pushing the spacers 1 is such a high-viscosity body that, when the spacers 1 are pushed into the binder resin layer 2 such that the spacers 1 are exposed from the binder resin layer 2, the binder resin layer 2 is plastically deformed so that the concaves 2b (FIG. 2) are formed in the binder resin layer 2 around the spacers 1; or is such a high-viscosity body that, when the spacers 1 are pushed into the binder resin layer 2 such that the spacers 1 are embedded in the binder resin layer 2 without being exposed from the binder resin layer 2, the concaves 2c (FIG. 3) are formed right above the spacers 1 on the surface of the binder resin layer 2. Therefore, the lower limit of the viscosity at 60° C. of the binder resin layer 2 is preferably 3000 Pa·s or more, more preferably 4000 Pa·s or more, and further preferably 4500 Pa·s or more, and the upper limit is preferably 20000 Pa·s or less, more preferably 15000 Pa·s or less, and further preferably 10000 Pa·s or less. The viscosity can be measured in a similar manner to that for the minimum melt viscosity, and determined by extracting a value at a temperature of 60° C.

A specific viscosity of the binder resin layer 2 when the spacers 1 are pushed into the binder resin layer 2 is set depending on the shape and depth of the concaves 2b and 2c to be formed, and the lower limit thereof is preferably 3000 Pa·s or more, more preferably 4000 Pa·s or more, and further preferably 4500 Pa·s or more, and the upper limit thereof is preferably 20000 Pa·s or less, more preferably 15000 Pa·s or less, and further preferably 10000 Pa·s or less. Such viscosity is preferably obtained at 40 to 80° C., more preferably 50 to 60° C.

When the concave 2b (FIG. 2) is formed around the spacer 1 exposed from the binder resin layer 2 as described above, resistance received from the resin due to flattening of the spacer 1 caused by the pressure-bonding of the spacer-containing tape to an article is reduced more than when the concave 2b does not exist. Therefore, the spacers become easy to be held during pressure-bonding, which improves capturing properties.

Also, since the concave 2c (FIG. 3) is formed in the surface of the binder resin layer 2 right above the embedded spacer 1 which is not exposed from the binder resin layer 2, the pressure at the time of pressure-bonding of the spacer-containing tape to an article is more likely to concentrate on the spacer 1 than when the concave 2c does not exist. This improves the capturing properties of the spacer and stabilizes pushing.

(Composition of Binder Resin Layer)

The binder resin layer 2 may be conductive or insulative, and plastic, thermocurable, or photocurable, depending on use applications of the spacer-containing tape. The binder resin layer 2 can be appropriately selected from known binder resin compositions depending on, for example, a target object or condition for applying the spacer-containing tape. Materials described in Japanese Patent Application Laid-Open No. 2015-134887 and Japanese Patent No. 6163045 mentioned above, and materials used in conductive adhesives containing micron-meter-size conductive particles (including films, also including anisotropic conductive adhesives and films) may be used.

The binder resin layer 2 may contain a filling agent, a softener, an accelerator, an antiaging agent, a colorant (pigment, dye), an organic solvent, an ion catcher agent, or the like. Also, the binder resin layer 2 can contain a filler having a microparticle diameter which is sufficiently smaller than the average particle diameter of the spacers (preferably a nanofiller of 20 to 1000 nm) for adjusting the viscosity of the binder resin composition. The material of such a filler can be appropriately selected from organic particles and inorganic particles which have been referred to for the spacers.

(Layer Thickness of Binder Resin Layer)

In the spacer-containing tape according to the present invention, the ratio (La/D) between the layer thickness La of the binder resin layer 2 and the particle diameter D of the spacers 1 is preferably 0.3 or more, more preferably 0.6 or more, from the viewpoint of retaining the spacers 1. The upper limit is not particularly limited, but preferably 30 or less, more preferably 10 or less, from the viewpoint of preventing unnecessary resin from squeezing out after pressure-bonding. Alternatively, the thickness is preferably 200 µm or less. Here, the particle diameter D of the spacers 1 means the average particle diameter thereof. When the layer thickness La of the binder resin layer 2 is too large, and this ratio is excessively large, spacers are hardly pressed against a gap forming surface during gap formation, and also easily flowed due to fluidized resin. Accordingly, spacers are easily displaced, which reduces the capturing properties of the spacers. Furthermore, thrust required for a pressing jig for pushing spacers against a gap forming surface also increases, which hinders the low-pressure mounting. Excessive pressing on an article, which is attributable to deformation, is not preferable. Conversely, when the layer thickness La of the binder resin layer 2 is too small, and this ratio is excessively small, it becomes difficult to retain the spacers 1 in a predetermined disposition by the binder resin layer 2.

(Embedding State of Spacers in Binder Resin Layer)

In the spacer-containing tape 10A according to the present example, the embedded rate (Lb/D) of the spacers 1 is 30% or more, preferably 60% or more and 105% or less, and the spacers 1 are embedded from one surface of the binder resin layer 2. The spacers 1 may penetrate through the binder resin layer. According to another aspect of the spacer-containing tape of the present invention, the spacers 1 are not exposed from the binder resin layer 2, and a concave (a portion that is concave more than the surface of a surrounding binder resin layer) 2c is formed in the surface of the binder resin layer 2 right above each of the spacers 1, like a spacer-containing tape 10B illustrated in FIG. 3.

The embedded rate used herein is a ratio (Lb/D) of an embedded amount Lb to a particle diameter D of the spacer 1 when a distance between the surface 2a of the binder resin layer 2 in which the spacers 1 are embedded (the surface on the side where the spacers 1 are exposed among the front and back surfaces of the binder resin layer 2, or the surface close to the spacer when the spacers are completely embedded in the binder resin layer 2), in particular, the tangent plane 2p in the center portion between the adjacent spacers and the deepest portion of the spacer 1 is defined as the embedded amount Lb (FIG. 2). Therefore, when the spacer 1 is embedded deeper than the film surface, the embedded rate (Lb/D) is more than 100%, and may be, for example, 105% or less. If the spacer 1 penetrates the binder resin layer, the embedded rate is 100%.

When the embedded rate is set to preferably 30% or more, more preferably 60% or more, the spacers 1 can be maintained in a prescribed particle dispersion state or in a predetermined arrangement by the binder resin layer 2, and the spacers and a member can be easily brought into contact with each other. Also, the spacers easily exhibit the function as a spacer. This is because performance can be easily adjusted by area occupancy ratio and number density of spacers, and materials. When the embedded rate is less than 30%, it may be difficult to retain a predetermined particle dispersion state or a predetermined arrangement. Also, since an excessively high upper limit causes unnecessary resin to exist during pressure-bonding, the embedded rate is preferably 105% or less, more preferably 100% or less, and further more preferably 95% or less, from the viewpoint of easily bringing spacers and a member into contact with each other.

In the present invention, the numerical value of the embedded rate (Lb/D) means that 80% or more, preferably 90% or more, more preferably 96% or more of the total number of spacers contained in the spacer-containing tape satisfies the numerical value of the embedded rate (Lb/D). Therefore, the embedded rate of 30% or more and 105% or less means that 80% or more, preferably 90% or more, more preferably 96% or more of the total number of spacers contained in the spacer-containing tape has an embedded rate of 30% or more and 105% or less. When the embedded rate (Lb/D) is similar among all spacers, the load of the pressing force is uniformly applied to the spacers, so that the capturing state of the spacers becomes favorable, and a function as a spacer is stabilized.

When the surface of the binder resin layer 2 and each of the tops 1a of the spacers 1 are substantially flush with each other (not illustrated), and the spacer-containing tape is configured as a vertically conductive tape, the resin amount in the film thickness direction around each of the spacers 1 advantageously becomes uniform during pressure-bonding as compared to the spacer-containing tape 10A (FIG. 2) in which the spacers 1 project from the binder resin layer 2. In particular, the resin amount around the top 1a of the spacer 1 is uniform in the spacer-containing tape 10B (FIG. 3) when the spacers are held during pressure-bonding. Thus, the spacers 1 are less likely to move, thereby increasing capturing properties as described above. Also, the spacers easily exhibit the function as a spacer. Conductive particles for vertical conduction may be previously mixed in resin, separately from the spacers. Alternatively, spacers serving as conductive particles may be adopted. The spacers and the conductive particles may be independently pushed into the tape. In this case, the surface of the tape to be pushed into may be the same or different between the spacers and the conductive particles. Alternatively, the spacers and the conductive particles may be previously mixed to be pushed into the tape. These methods may be combined.

Also, in the spacer-containing tape 10A described above (FIG. 2), the portions of the surface in which the spacers 1 are embedded and with which the spacers 1 are in contact and in the vicinity thereof among the front and back surfaces of the binder resin layer 2 are concave relative to the surrounding flat surface 2a. This concave 2b is formed when the viscosity of the binder resin layer, during the pushing of the spacers 1 into the binder resin layer 2 to produce a spacer-containing tape, is within the above-described preferable viscosity range. When the spacer-containing tape is configured as a vertically conductive tape, the presence of the concaves 2b in the surface of the binder resin layer 2 reduces the resistance received from the binder resin layer 2 due to the flattening of the spacers 1 that occurs when the spacers 1 are held by conduction parts at the time of vertical conduction, as compared to the absence of a concave 2b. Thus, the effect of facilitating uniform pushing of the spacers at terminals can be expected.

Also, the concaves 2c in the spacer-containing tape 10B (FIG. 3) are formed when the viscosity of the binder resin layer 2, during the pushing of the spacers 1 into the binder resin layer 2 to produce a spacer-containing tape, is within the above-described preferable viscosity range. When the spacer-containing tape is configured as a vertically conductive tape, the formation of the concaves 2c in the surface of the binder resin layer 2 facilitates the concentration of the pressure on the spacers 1 during vertical conduction as compared to the absence of a concave 2c. Thus, the effect of facilitating the uniform pushing of the spacers at a conduction part can be expected.

The existence of the concaves 2b and 2c in the surface of the binder resin layer 2 can be confirmed by observing the cross section of a spacer-containing tape with a scanning electron microscope, or also by a plane-view observation with a scanning electron microscope. The concaves can also be observed by an optical microscope or a metallurgical microscope.

<□Inclination□ or □undulation□ Alternative to Concave>

The □concaves□ 2b and 2c illustrated in FIG. 2 and FIG. 3 can also be described from the viewpoint of an □inclination□ or an □undulation□. This will be described below with reference to the drawings.

The spacer-containing tape 10A includes the spacer-dispersed layer 3 (FIG. 2). In the spacer-dispersed layer 3, the plurality of spacers 1 are distributedly disposed independently from each other on one surface of the binder resin layer 2. The spacers 1 are not in contact with each other in the plan view of the film, and are also regularly dispersed without overlapping each other in the film thickness direction, thereby constituting a single spacer layer in which the spacers 1 are aligned in position in the film thickness direction.

On the surface 2a of the binder resin layer 2 around each of the spacers 1, an inclination 2b is formed with respect to a tangent plane 2p of the binder resin layer 2 in the center portion between adjacent spacers. As will be described later, in the spacer-containing tape of the present invention, an undulation 2c may be formed on the surface of the binder resin layer right above the spacer 1 embedded into the binder resin layer 2 (FIG. 3).

In the present invention, the □inclination□ means a state in which the flatness of the surface of the binder resin layer is impaired in the vicinity of the spacer 1, and a part of the resin layer is lacked with respect to the tangent plane 2p, resulting in a decreased resin amount. In other words, in the inclination, the surface of the binder resin layer around the spacer is lacked with respect to the tangent plane. On the other hand, the □undulation□ means a state in which a waviness is generated on the surface of the binder resin layer right above the spacer, and the amount of resin is reduced due to the existence of a portion having a height difference such as a waviness. In other words, the resin amount of the binder resin layer right above the spacer is smaller than that when the surface of the binder resin layer right above the spacer is flush with the tangent plane. These can be seen by comparing a portion right above the spacer with a flat surface portion between the spacers (FIG. 2, FIG. 3). It is noted that the starting point of the undulation may be present as an inclination.

As described above, the formation of the inclination 2b (FIG. 2) around the spacer 1 exposed from the binder resin layer 2 reduces the resistance received from the binder resin due to the flattening of the spacer 1 that occurs when the spacer 1 is pressed during gap formation in the spacer-containing tape, as compared to the absence of an inclination 2b. Therefore, the spacers are easy to be held by the terminals, which also improves capturing properties. This inclination preferably follows the outer shape of the spacer. This is because, in addition to the facilitating expression of the effect in connection, the spacer becomes easy to be recognized, which facilitates, for example, testing in the production of the spacer-containing tape. Also, there may be a case in which part of this inclination or undulation is lost due to, for example, the heat-pressing of the binder resin layer, but the present invention encompasses this case. In this case, the spacer may be exposed at one point on the surface of the binder resin layer. When the spacer-containing tape is configured as a vertically conductive tape, there are various electronic components to be connected, and as long as tuning is performed according to these, it is desired that the degree of freedom of design be high so as to satisfy various requirements. Therefore, even if the inclination or undulation is reduced or partially lost, the spacer-containing tape can be used.

Further, since the undulation 2c (FIG. 3) is formed on the surface of the binder resin layer 2 right above the spacer 1 which is embedded without being exposed from the binder resin layer 2, the pressing force during gap formation tends to be applied to the spacer, in the same manner as that of the case of the inclination. In addition, since the amount of the resin right above the spacer is reduced due to the presence of the undulation compared with the case where the resin is deposited flat, the resin right above the spacer is easily removed during gap formation, and the capturing properties of the spacer are improved.

From the viewpoint of facilitating obtaining of the effects of the inclination 2b (FIG. 2) around the exposed portion of the spacer and the undulation 2c (FIG. 3) of the binder resin layer right above the spacer, the ratio (Le/D) of the maximum depth Le of the inclination 2b around the exposed portion of the spacer 1 to the particle diameter D (usually, average particle diameter) of the spacer 1 is preferably less than 50%, more preferably less than 30%, and further preferably 20 to 25%; the ratio (Ld/D) of the maximum diameter Ld of the inclination 2b around the exposed portion of the spacer 1 to the particle diameter D of the spacer 1 is preferably 100% or more, and more preferably 100 to 150%; and the ratio (Lf/D) of the maximum depth Lf of the undulation 2c in the resin right above the spacer 1 to the particle diameter D of the spacer 1 is more than 0, preferably less than 10%, and more preferably 5% or less.

The diameter Lc of the exposed portion of the spacer 1 can be equal to or less than the particle diameter D of the spacer 1, and the ratio (Lc/D) to the particle diameter D is preferably 10 to 90%. Also, the top of the spacer 1 may be exposed at one point, or the spacer may be completely embedded in the binder resin layer 2 with the diameter Lc becoming zero.

An aspect of the method of producing the spacer-containing tape according to the present invention, which has been reconsidered from the viewpoint of the inclination and undulation near the spacer on the surface of the spacer-containing tape, will be described below.

That is, the production method of the present invention is a method of producing the spacer-containing tape, including a step of forming a spacer-dispersed layer containing at least a binder resin layer and a plurality of spacers, in which
  the step of forming a spacer-dispersed layer has
    a step of retaining a state in which the spacers are dispersed on the surface of the binder resin layer, and
    a step of pushing the spacers dispersed and retained on the surface of the binder resin layer into the binder resin layer,
  and in the step of pushing the spacers into the binder resin layer, the viscosity of the binder resin layer, the pushing speed, or the temperature when the spacers are pushed is adjusted such that: a surface of the binder resin layer in the vicinity of each of the spacers has an inclination or an undulation with respect to the tangent plane of the binder resin layer in the center portion between adjacent spacers; in the inclination, the surface of the binder resin layer around the spacer is lacked with respect to the tangent plane; and in the undulation, the resin amount of the binder resin layer right above the spacer is smaller than that when the surface of the binder resin layer right above the spacer is flush with the tangent plane.

In the present invention described above, the existence of the inclination 2b and the undulation 2c on the surface of the binder resin layer 2 can be confirmed by observing the cross section of the spacer-containing tape with a scanning electron microscope, or by a plane-view observation. The inclination 2b and the undulation 2c can also be observed with an optical microscope or a metallurgical microscope. Also, the sizes of the inclination 2b and the undulation 2c can be confirmed by, for example, adjusting the focus during image observation. The same operation can be applied to the cases even after the inclination or the undulation is reduced by heat-pressing as described above. This is because traces may remain.

<Modified Aspect>

In the spacer-containing tape according to the present invention, the spacers 1 are usually disposed on one surface of the spacer-dispersed layer 3, but may be disposed on both surfaces. Also, a second resin layer which does not contain the spacers 1 can be laminated to the spacer-dispersed layer 3 for adjusting thickness, viscosity (minimum melt viscosity), and adhesiveness (tackiness). A resin layer may be disposed on both surfaces such that the spacer-dispersed layer 3 is held therebetween (a third resin layer may be provided). The composition may be the same or different among the spacer-dispersed layer 3, the second resin layer, and the third resin layer. As described above, adjustment can be appropriately performed depending on an intended use. The spacer-dispersed layer 3 may be laminated, or the second resin layer and the third resin layer (the forth or more resin layer may exist in the same way) may be disposed between layers or as the outermost layer.

<Method of Producing Spacer-Containing Tape>

The spacer-containing tape of the present invention can be produced by a production method which includes a step of forming a spacer-dispersed layer containing at least a binder resin layer and a plurality of spacers. This step of forming a spacer-dispersed layer has a step of retaining a state in which the spacers are dispersed on the surface of the binder resin layer and a step of pushing the spacers dispersed and retained on the surface of the binder resin layer into the binder resin layer.

Herein, the embedded amount Lb of the spacers 1 in the binder resin layer 2 can be adjusted by the pressing force, temperature, and the like during the pushing of the spacers 1. The presence or absence, shape, and depth of the concaves 2b and 2c can be adjusted by the viscosity of the binder resin layer 2, pushing speed, temperature, and the like during pushing.

The method for retaining the spacers 1 in the binder resin layer 2 is not particularly limited. For example, a transfer mold is used to retain the spacers 1 in the binder resin layer 2. Examples of the transfer mold to be used may include transfer molds obtained by forming openings to transfer mold materials of inorganic materials such as silicon, various ceramics, glass, and metal such as stainless steel, and organic materials such as various reins, by a known opening-forming method such as a photolithography method. The transfer mold can have a shape of a plate, a roll, or the like.

When the spacer-containing tape is configured as a vertically conductive tape, the vertically conductive tape may use conductive particles serving as spacers, or conductive particles in addition to insulating spacers.

The spacer-containing tape preferably has a certain long length for economically bonding articles with the spacer-containing tape. The length to be produced is preferably 5 m or more, more preferably 10 m or more, and further preferably 25 m or more. On the other hand, when the spacer-containing tape is excessively long, a known connecting device, which is used when producing a bonded structure with the spacer-containing tape, cannot be used, and handleability is poor. Therefore, the length of the spacer-containing tape to be produced is preferably 5000 m or less, more preferably 1000 m or less, and further preferably 500 m or less. Such a long-length spacer-containing tape is preferably wound up around a winding core into a wound body, in terms of excellent handleability. The width of the spacer-containing tape can be selected depending on its intended use. For example, the width is preferably 0.3 mm or more, more preferably 0.5 mm or more, for reasons of mechanical restrictions in cutting. The upper limit thereof is not particularly limited, but preferably 1 m or less, more preferably 0.8 m or less, for preventing handleability from becoming poor due to excessively wide width.

Bonding (in other words, production of a bonded connection body) with the spacer-containing tape of the present invention can be performed by any known method. For example, the spacer-containing tape may be cut as necessary, and the cut tape may be bonded to a part and thereafter pressurized, or may be heated as necessary. Light irradiation may also be used.

<Method of Using Spacer-Containing Tape>

Figure 4A:
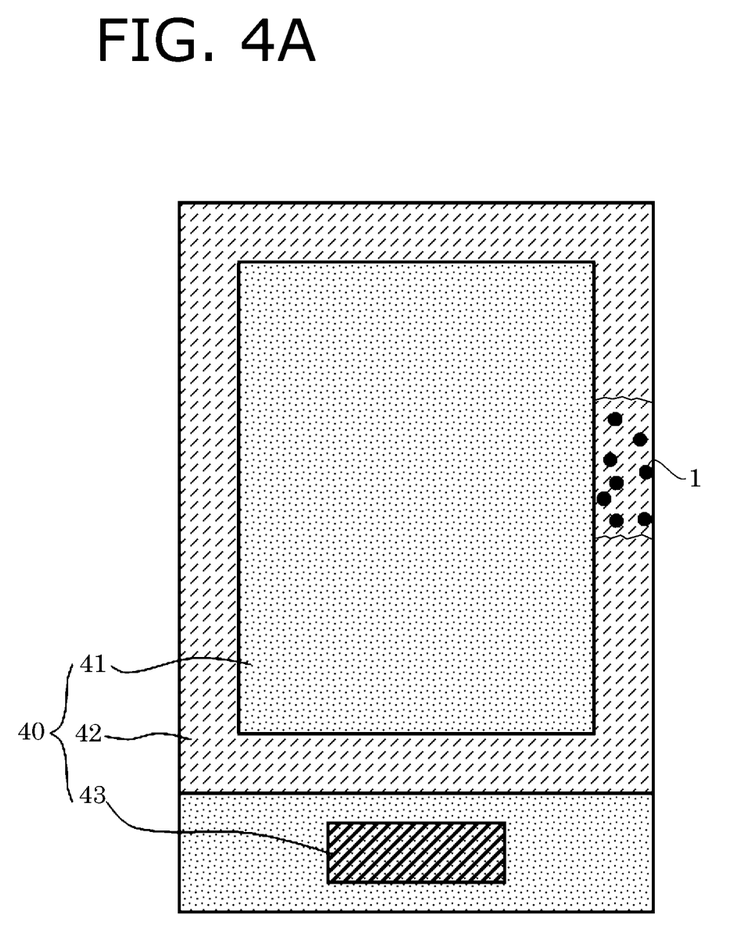
FIG. 4A is a plan view of a liquid crystal display device to which a known frame-like body is applied.
Figure 4B:
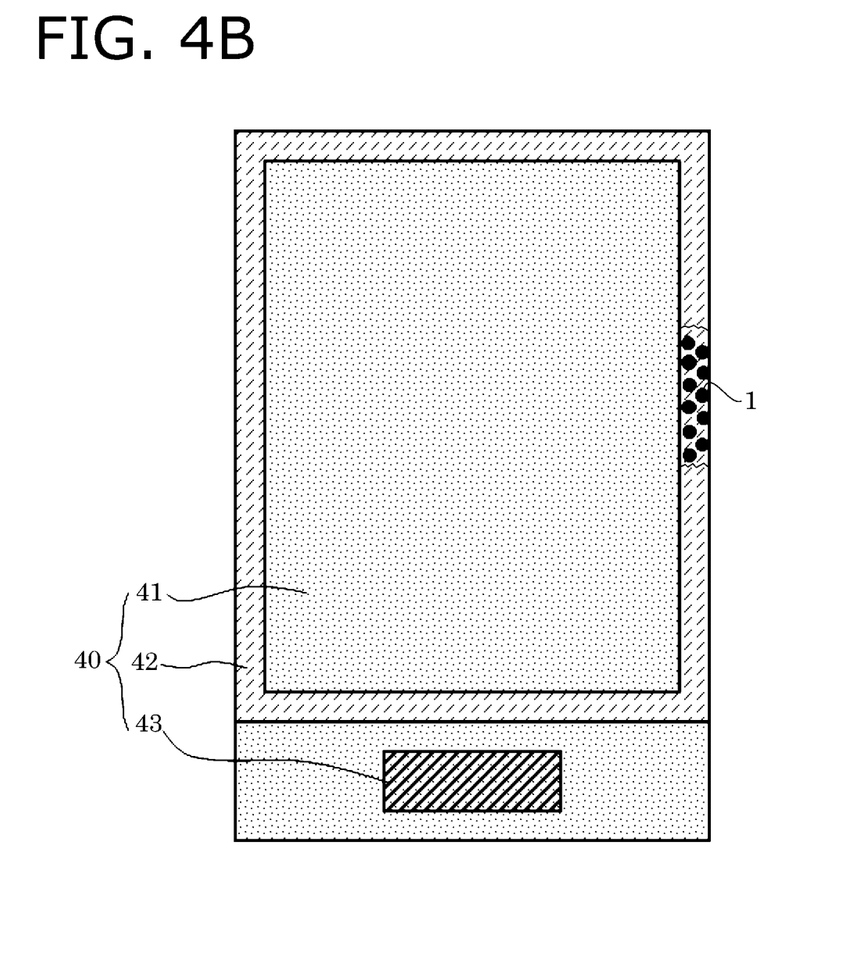
FIG. 4B is a plan view of a liquid crystal display device to which a frame-like body of an example is applied.

The spacer-containing tape of the present invention can be applied to various gap formation situations. For example, as illustrated in FIG. 4A (conventional example) and FIG. 4B (present example), the spacer-containing tape of the present invention can be applied for gap formation and bonding between a liquid crystal display element 41 constituting a liquid crystal display device 40 and a frame-like body 42 on the rim of the liquid crystal display element 41. The liquid crystal display device 40 includes a driving IC mounting portion 43 outside the frame-like body 42. In FIG. 4A, the spacers 1 are disposed on the rim of the liquid crystal display device 40 by a spraying method, and therefore, the spaying may become non-uniform in some cases. Therefore, the width of the frame-like body 42 needs to be designed such that it is wide to some extent for achieving stable gap formation. On the other hand, in the present example of FIG. 4B, the plurality of spacers 1 are distributedly disposed (preferably regularly distributedly disposed) on the rim of the liquid crystal display device 40 independently from each other on one surface of the binder resin layer. Therefore, the width of the frame-like body 42 can be designed such that it is narrow to some extent. As necessary, the tape can be cut into a predetermined length for use. For example, for adapting to narrow width, the use method of cutting a wide tape may be employed. Therefore, a small piece of a tape may be used for bonding. In FIGS. 4A and 4B, only a portion of the sprayed surface of the rim is shown in detail.

Figure 5A:
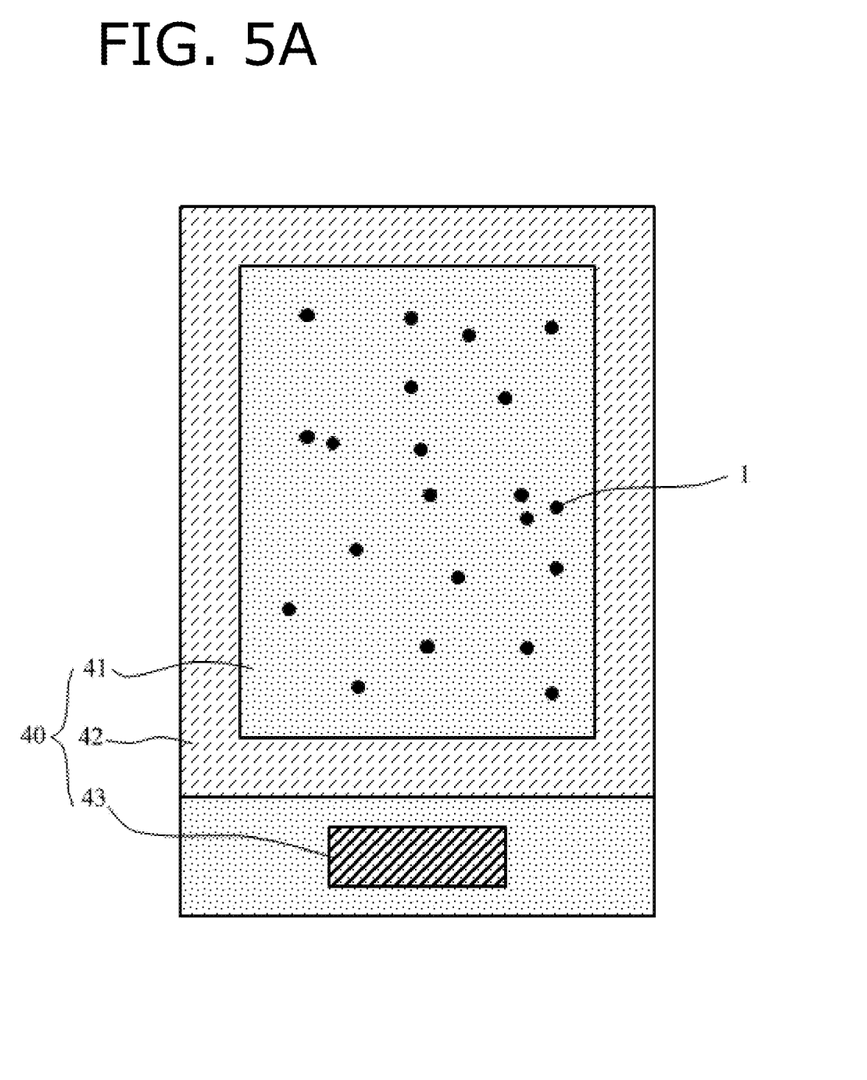
FIG. 5A is a plan view of a liquid crystal display device to which a known frame-like body is applied.
Figure 5B:
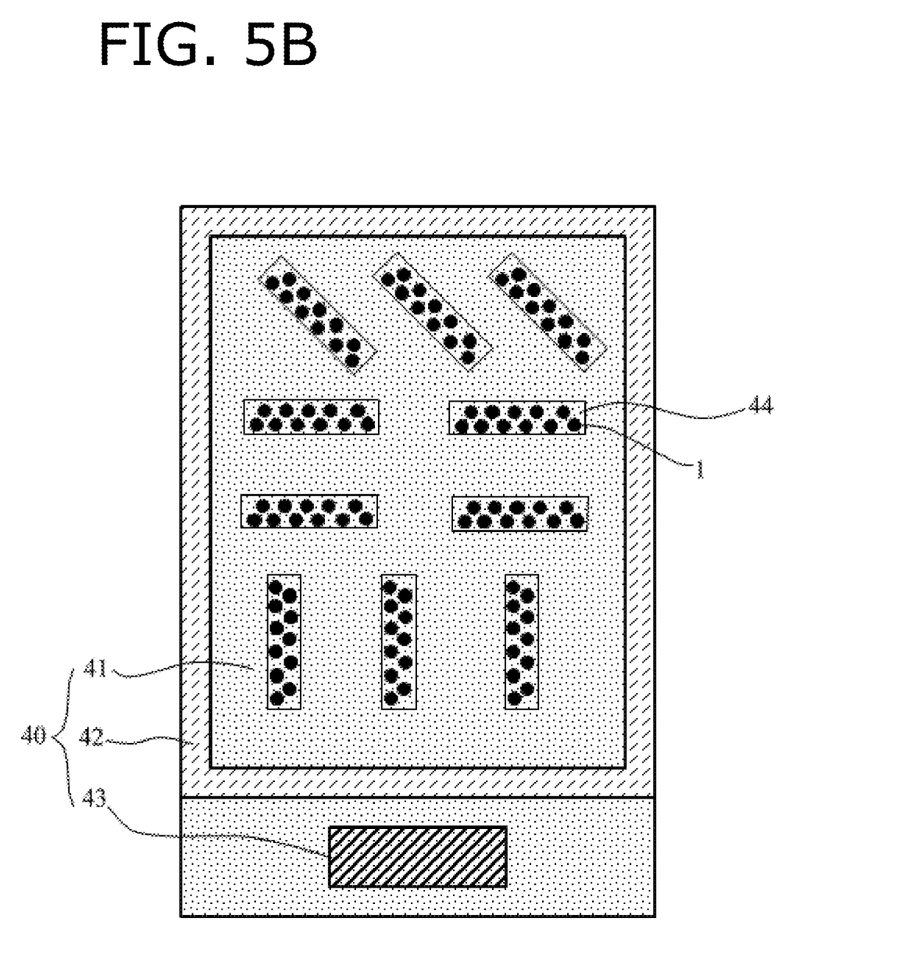
FIG. 5B is a plan view of a liquid crystal display device to which a frame-like body of an example is applied.

Also, as illustrated in FIG. 5A (conventional example) and FIG. 5B (present example), the spacer-containing tape of the present invention can be applied to gap formation on a display surface of a liquid crystal display element 41 constituting a liquid crystal display device 40. In FIG. 5A, the spacers 1 are randomly sprayed between a pair of transparent substrates (a display surface) of the liquid crystal display element 41. Therefore, spraying becomes non-uniform in some cases, thereby inhibiting stable gap formation or selective disposition of spacers. On the other hand, in the present example of FIG. 5B, spacers can be disposed at intended positions in a unit of a spacer-containing tape 44 in which the spacers 1 are disposed. Therefore, stable gap formation is enabled in a wide area, and spacers can be selectively disposed depending on a state of a gap forming surface.

Like the above-described liquid crystal display device, a bonded structure in which a first component and a second component are bonded with the spacer-containing tape of the present invention interposed therebetween is part of the present invention.

REFERENCE SIGNS LIST 1 spacer
1a top of spacer 2 binder resin layer
2a surface of binder resin layer
2b concave (inclination)
2c concave (undulation)
2p tangent plane
3 spacer-dispersed layer
10A, 10B, 44 spacer-containing tape
40 liquid crystal display device
41 liquid crystal display element
42 frame-like body
43 driving IC mounting body
A lattice axis
La layer thickness of binder resin layer
Lb embedded amount of spacer with respect to particle diameter D thereof
Lc diameter of exposed portion of spacer
Ld maximum diameter of inclination around exposed portion of spacer
Le maximum depth of inclination around exposed portion of spacer
Lf maximum depth of undulation in resin right above spacer
D particle diameter of spacer
θ angle formed between long-side direction of spacer-containing tape and lattice axis

The invention claimed is:

1. A conductive tape comprising a conductive particle-containing layer containing at least a binder resin layer and a plurality of conductive particles, wherein
the plurality of conductive particles are distributedly disposed independently from each other on one surface of the binder resin layer, each of the conductive particles being at least partially embedded in the binder resin layer,
a surface of the binder resin layer in a vicinity of each of the conductive particles has an inclination or an undulation with respect to a tangent plane of the binder resin layer in a centermost portion between adjacent conductive particles,
in the inclination, the surface of the binder resin layer directly adjacent to and contacting the conductive particle is indented below the tangent plane, and
in the undulation, a resin amount of the binder resin layer right above the conductive particle is smaller than that when the surface of the binder resin layer right above the conductive particle is flush with the tangent plane.

2. The conductive tape according to claim 1, wherein the conductive particles are distributedly disposed regularly on the one surface of the binder resin layer.

3. The conductive tape according to claim 1, wherein an area occupancy ratio of the conductive particles calculated by the following formula is 35% or less:

Area occupancy ratio of conductive particles (%)= [number density of conductive particles in plan view]×[average of plan view area per conductive particle]×100.

4. The conductive tape according to claim 1, wherein a ratio (Lb/D) between a distance Lb of a deepest portion of the conductive particle from the tangent plane and a particle diameter D of the conductive particles is 30% or more.

5. The conductive tape according to claim 1, wherein a ratio (La/D) between a layer thickness La of the binder resin layer and a particle diameter D of the conductive particles is 0.6 or more.

6. The conductive tape according to claim 1, wherein the conductive particles are disposed on one surface of the conductive particle-containing layer.

7. The conductive tape according to claim 1, wherein the conductive particles are disposed on both surfaces of the conductive particle-containing layer.

8. The conductive tape according to claim 1, wherein a resin layer containing no conductive particle is laminated on at least one surface of the conductive particle-containing layer.

9. The conductive tape according to claim 1, wherein the conductive tape enables conduction between front and back surfaces of a tape.

10. A bonded structure in which a first component and a second component are bonded and conducted with the conductive tape according to claim 1 interposed therebetween.

11. A method for producing a bonded structure comprising bonding and conducting a first component and a second component with the conductive tape according to claim 1 interposed therebetween.

12. The conductive tape according to claim 1, wherein the tangent plane intersects the conductive particles.

* * * * *